US006191637B1

(12) United States Patent
Lewicki et al.

(10) Patent No.: US 6,191,637 B1
(45) Date of Patent: Feb. 20, 2001

(54) SWITCHED CAPACITOR BIAS CIRCUIT FOR GENERATING A REFERENCE SIGNAL PROPORTIONAL TO ABSOLUTE TEMPERATURE, CAPACITANCE AND CLOCK FREQUENCY

(75) Inventors: Laurence Douglas Lewicki, Sunnyvale; Shu-Ing Ju, Palo Alto, both of CA (US)

(73) Assignee: National Semiconductor Corporation, Santa Clara, CA (US)

( * ) Notice: Under 35 U.S.C. 154(b), the term of this patent shall be extended for 0 days.

(21) Appl. No.: 09/263,134

(22) Filed: Mar. 5, 1999

(51) Int. Cl.[7] ........ G06F 7/64
(52) U.S. Cl. ........ 327/337; 327/538; 323/316
(58) Field of Search ........ 327/91–94, 337, 327/538; 323/315–317

(56) References Cited

U.S. PATENT DOCUMENTS

| | | | | |
|---|---|---|---|---|
| 4,374,357 | | 2/1983 | Olesin et al. | 323/351 |
| 5,023,489 | * | 6/1991 | Macbeth | 327/337 |
| 5,059,832 | * | 10/1991 | Hughes | 327/337 |
| 5,109,169 | * | 4/1992 | Hughes | 327/337 |
| 5,563,504 | | 10/1996 | Gilbert et al. | 323/316 |
| 5,621,355 | | 4/1997 | Williams et al. | 330/107 |

OTHER PUBLICATIONS

IEEE Journal of Solid–State Circuits, vol. SC–20, No. 3, Jun. 1985, "The Design of High–Performance Analog Circuits on Digital CMOS Chips", pp. 657–665.

* cited by examiner

*Primary Examiner*—Kenneth B. Wells
(74) *Attorney, Agent, or Firm*—Baker & McKenzie

(57) ABSTRACT

An integrated switched capacitor bias circuit for generating a reference signal which is proportional to absolute temperature, a capacitance and a clock signal frequency. A current mirror circuit generates a primary current and a mirrored current. Under the control of a clock signal, a switched capacitor circuit uses the mirrored current to constantly accumulate charges on primary capacitor while also alternately sharing such charges with and then discharging one of two additional capacitors. The magnitude of the current drawn by the switched capacitor circuit is a factor of the junction area of a diode and absolute temperature. To maintain equality of the primary and mirrored currents, a node voltage within the current mirror circuit is monitored by a bias circuit which provides a bias signal for controlling the current mirror circuit. An additional current replication stage is driven by the current mirror circuit to provide an additional mirrored current which is proportional to a product of absolute temperature and the frequency of the clock signal.

26 Claims, 3 Drawing Sheets

SWITCHED CAPACITOR BIAS CIRCUIT FOR GENERATING A REFERENCE SIGNAL PROPORTIONAL TO ABSOLUTE TEMPERATURE, CAPACITANCE AND CLOCK FREQUENCY

BACKGROUND OF THE INVENTION

1. Field of the Invention

The present invention relates to bias circuits for switched capacitor circuits, and in particular, to bias circuits for switched capacitor circuits which compensate for process tolerances, temperature and clock frequency.

2. Description of the Related Art

In circuit applications involving switched capacitor circuits, the amplifiers are typically required to drive only capacitive loads which do not require much, if any, DC current. Accordingly, such amplifiers can be designed without a low impedance output stage, such as an emitter follower or source follower circuit. As a result of this design simplification, such amplifiers used in switched capacitor circuits typically have a high output impedance and are often referred to as "operational transconductance amplifiers" to differentiate them from operational amplifiers having low output impedance. Applications in which high output impedances are acceptable allow single-stage operational transconductance amplifiers to be used. Such amplifiers are typically folded-cascode or telescopic (i.e., unfolded cascode) designs.

Referring to FIG. 1, such an amplifier will typically have a single dominant pole, thereby making the unity gain bandwidth proportional to the ratio of the transconductance $g_m$ of the input stage and the load capacitance $C_{LOAD}$. Accordingly, as represented in the graph of FIG. 1, this relationship between unity gain bandwidth frequency $f_{unity}$, transconductance $g_m$ and load capacitance $C_{LOAD}$ can be expressed by Equation (1) below.

$$f_{unity} \propto \frac{g_m}{C_{LOAD}} \tag{1}$$

If the input differential pair of transistors (metal oxide semiconductor field effect transistors, or MOSFETs) of the operational transconductance amplifier are biased in the subthreshold region, then the input stage transconductance $g_m$ is inversely proportional to the product of Boltzmann's constant k and absolute temperature T divided by charge q. Accordingly, it follows that the input stage transconductance $g_m$, using equations 2, 3 and 4 below, can be found using the drain current $I_D$, majority carrier mobility $\mu$, gate oxide capacitance per unit area $C_{ox}$, channel width W and length L, gate-to-source voltage $V_{GS}$, threshold voltage $V_{TO}$, source voltage $V_S$ and number n of output devices.

$$\text{If } I_D \ll \beta \cdot \left(\frac{kT}{q}\right)^2 \text{ where } \beta = \mu C_{ox} \frac{W}{L} \tag{2}$$

$$\text{Then } I_D = \beta \left(\frac{kT}{q}\right)^2 e^{\left(\frac{(V_{GS}-V_{TO}-nV_S)}{\frac{nkT}{q}}\right)} \tag{3}$$

$$g_m = \frac{\partial I_D}{\partial V_{GS}} = \frac{I_D}{\frac{nkT}{q}} \text{ (subthreshold)} \tag{4}$$

Equations (1) and (4) can be combined to express the unity gain bandwidth frequency $f_{unity}$ according to Equation (5).

$$f_{unity} \propto \frac{I_D}{\frac{nkT}{q} \cdot C_{LOAD}} \tag{5}$$

As seen in Equation (5), if the drain current $I_D$ can be made proportional to the product of absolute temperature T and load capacitance $C_{LOAD}$, the unity gain frequency $f_{unity}$ will be constant for all process and temperature variations. Ideally, the unity gain frequency $f_{unity}$ of the operational transconductance amplifier should track the frequency of the clock signal (with clock signal period $T_{clock}$) for the switched capacitor filter. Accordingly, relations for the unity gain frequency $f_{unity}$ and drain current $I_D$ can be expressed according to Equations (6) and (7) below.

$$\text{assuming } f_{unity} \propto \frac{1}{T_{clock}} \tag{6}$$

$$\text{then } I_D \propto \frac{\frac{nkT}{q} \cdot C_{LOAD}}{T_{clock}} \tag{7}$$

As should be recognized, the quotient of load capacitance $C_{LOAD}$ and clock signal $T_{clock}$ in Equation (7) is the approximate expression for a switched capacitor resistor equivalent.

Referring to FIG. 2, many conventional designs generate a PTAT (proportional to absolute temperature) bias current by developing a "difference voltage" across a resistor, where such "difference voltage" is the difference between the forward biased junction voltages of the diodes D21, D22. When the bias current lout generated by this circuit is substituted into Equation (4), the relationship for the subthreshold MOSFET transconductance $g_m$ can be expressed according to Equation (8) below.

$$g_m = \frac{I_D}{\frac{nkT}{q}} = \frac{\ln(A)}{n \cdot R} \text{ (subthreshold)} \tag{8}$$

According to Equation (8), if the resistor R has no temperature dependance, the transconductance $g_m$ will be constant. Based upon this, it can then be shown that the unity gain frequency $f_{unity}$ of the operational transconductance amplifier can be expressed according to Equation (9).

$$f_{unity} \propto \frac{\ln(A)}{n \cdot R(1 + aT + bT^2) \cdot C_{LOAD}} \tag{9}$$

According to Equation (9), the unity gain frequency $f_{unity}$ and the settling of the operational transconductance amplifier is a function of the absolute tolerances of the resistor R (typically within a range of ±20%) and the load capacitance $C_{LOAD}$ (typically within a range of ±10%). Assuming a linear resistor temperature coefficient equal to +700 ppm/° C. and a temperature range of −40° C. to +85° C., the overall tolerance of the unity gain frequency will be within a range of ±40%. This implies that in order to guarantee that the operational transconductance amplifiers (which are biased by the circuit of FIG. 2) will meet minimum settling time requirements, the bias current must be 40% larger than what would otherwise be considered optimum.

Referring to FIG. 3, another conventional design provides a compensated reference current Iref which is a function of a reference voltage Vref, a capacitance C and clock signal period Td. (This circuit is described in more detail in E. A. Vittoz, "The Design of High-Performance Analog Circuits on Digital CMOS Chips," IEEE Journal of Solid-State Circuits, Vol. SC-20, no. 3, June 1985, pp. 657–65.) This circuit forms a servo loop in which, during one clock phase Td, capacitor C is charged to the reference voltage Vref and transistor M1 drains charge from capacitor Cs which is equal to the product of the reference current Iref and the clock period Td.

During the next clock phase, capacitors C and Cs are shorted together and also connected to the inverting input of the operational amplifier. If the charge drained from capacitor Cs by transistor M1 was more than that which is now available via charge sharing from capacitor C (i.e., the product of the reference voltage Vref and capacitance C), then the inverting input of the operational amplifier will be pulled to a lower potential which, in turn, will cause the gate terminal of transistor M4 to be pulled to a higher potential, thereby reducing the magnitude of the reference current Iref (due to the current mirror action of transistors M3 and M5).

This circuit has a number of disadvantages. This circuit requires a separate voltage reference circuit, the accuracy of the charge transfer (and power supply rejection) from capacitor C to capacitor Cs is sensitive to switch charge injection, and the value of the reference current is sensitive to the clock period Td. Additionally, this circuit is sensitive to parasitic capacitances on the top plates of capacitors C and Cs. Stray capacitances on these nodes will become discharged when the voltage changes during different clock cycles.

Referring to FIG. 4, another conventional design operates in an "open loop" manner and does not use any feedback. (This design is discussed in more detail in Olesin et al., U.S. Pat. No. 4,374,357, the disclosure of which is incorporated herein by reference.) In this design, capacitors C22 and C40 are alternately charged and discharged by transistors M18, M20, M36 and M38 during successive states of the clock signal. An average current equal to the product of the capacitance of capacitor C22 (or capacitor C40 since they are equal), the reference voltage Vref and two times the frequency of the clock signal (=C22*Vref*2*$f_{clock}$) flows through the diode-connected MOSFET M50. The gate terminal of transistor M50 is a low impedance node which is bypassed by filter capacitor C52 and is used to bias transistor M54.

This circuit also has a number of disadvantages, including poor accuracy and poor power supply rejection. There are inherent errors caused by the drain voltage of transistor M50 not matching the drain voltage of transistor M54, as well as mismatched drain voltages for transistors M56 and M60, transistors M62 and M64, and transistors M28 and M30. Additionally, this circuit provides little high frequency ripple filtering due to the lack of high impedance nodes. All filter capacitors are connected directly across diode-connected transistors (e.g., transistors M50 and M56). Accordingly, the reference current generated by this circuit will have ripple at twice the frequency of the clock signal.

SUMMARY OF THE INVENTION

A switched capacitor bias circuit for generating a reference signal which is proportional to absolute temperature, capacitance and clock frequency in accordance with the present invention uses a double-sampled switched capacitor "resistor" and an integration capacitor within a PTAT (proportional to absolute temperature) loop to generate bias currents which are proportional to capacitance, clock frequency and absolute temperature. Such currents are optimal for biasing operational amplifiers in switched capacitor filters where settling is dominated by the closed loop bandwidth rather than slewing. Such a circuit compensates for variation in the load capacitance and temperature to minimize power dissipation.

In accordance with one embodiment of the present invention, an integrated switched capacitor bias circuit for generating a reference signal which is proportional to absolute temperature, a capacitance and a clock signal frequency includes a current mirror circuit, a bias circuit and a switched capacitor circuit. The current mirror circuit is configured to receive a bias voltage and in accordance therewith provide a primary current, first and second mirrored currents and a node voltage, with the node voltage being responsive to the first mirrored current. The bias circuit, coupled to the current mirror circuit, is configured to receive the node voltage and in accordance therewith provide the bias voltage. The switched capacitor circuit, coupled to the current mirror circuit, includes a capacitance and is configured to receive first and second clock signals which are equal in frequency and mutually inverse in phase and in accordance therewith receive and conduct the first mirrored current in proportion to an absolute temperature of the switched capacitor circuit, the capacitance and the clock signal frequency. The second mirrored current is proportional to a product of the absolute temperature, the capacitance and the clock signal frequency.

In accordance with another embodiment of the present invention, a method of generating a reference signal which is proportional to absolute temperature, a capacitance and a clock signal frequency includes the steps of:

receiving a bias voltage and in accordance therewith generating a primary current, first and second mirrored currents and a node voltage, wherein the node voltage is responsive to the first mirrored current;

receiving the node voltage and in accordance therewith generating the bias voltage; and receiving, with a capacitive circuit having a capacitance, first and second clock signals which are equal in frequency and mutually inverse in phase and in accordance therewith receiving and conducting the first mirrored current in proportion to an absolute temperature, the capacitance and the clock signal frequency;

wherein the second mirrored current is proportional to a product of the absolute temperature, the capacitance and the clock signal frequency.

These and other features and advantages of the present invention will be understood upon consideration of the following detailed description of the invention and the accompanying drawings.

DETAILED DESCRIPTION OF THE INVENTION

Figure 1:
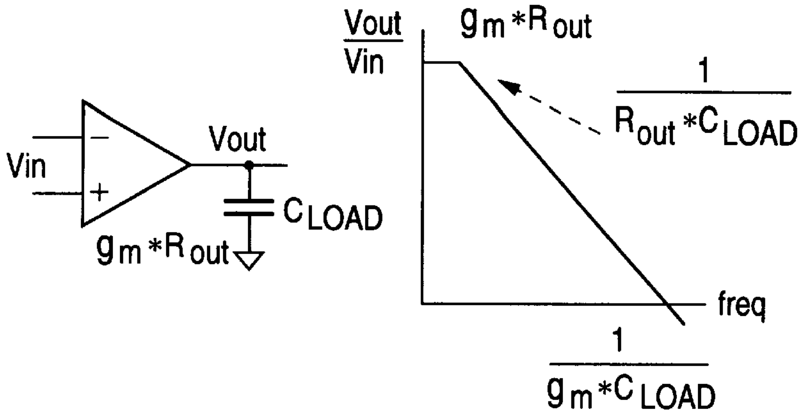
FIGURE 1 (PRIOR ART)
FIG. 1 is a schematic diagram and corresponding frequency response graph for the open loop frequency response of a typical operational transconductance amplifier.
Figure 2:
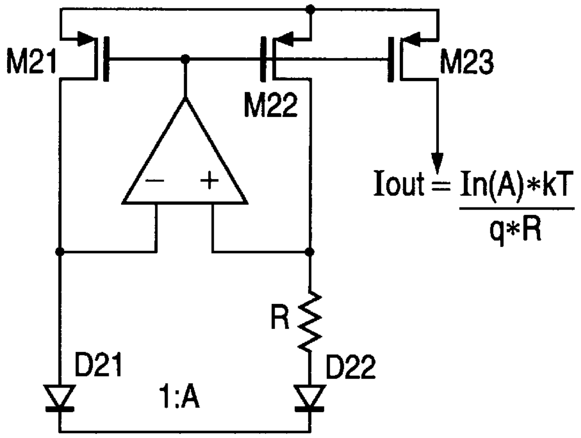
FIGURE 2 (PRIOR ART)
FIG. 2 is a schematic diagram of a conventional PTAT current generator.
Figure 5:
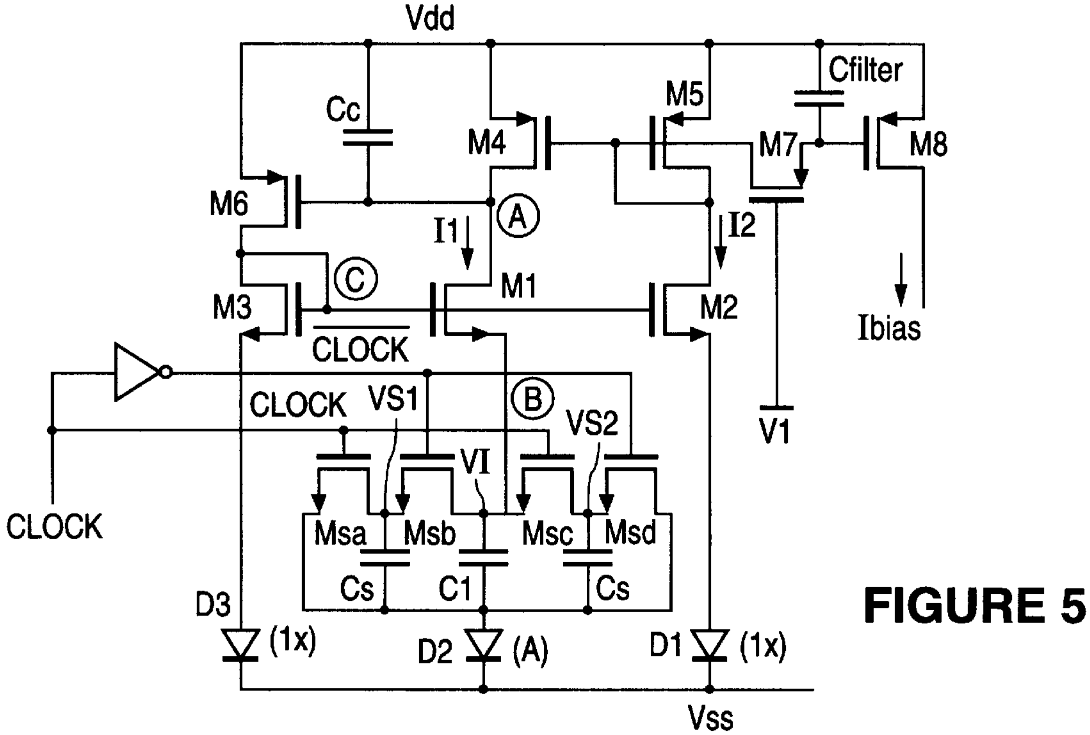
FIG. 5 is a schematic diagram of a switched capacitor bias circuit in accordance with one embodiment of the present invention.
Figure 3:
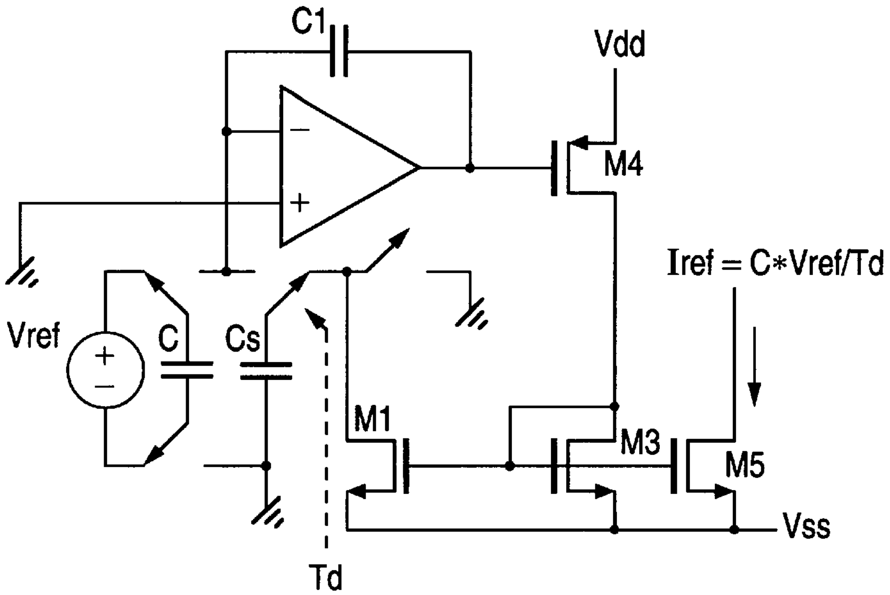
FIGURE 3 (PRIOR ART)
FIG. 3 is a schematic diagram of a conventional voltage-to-current conversion circuit.
Figure 4:
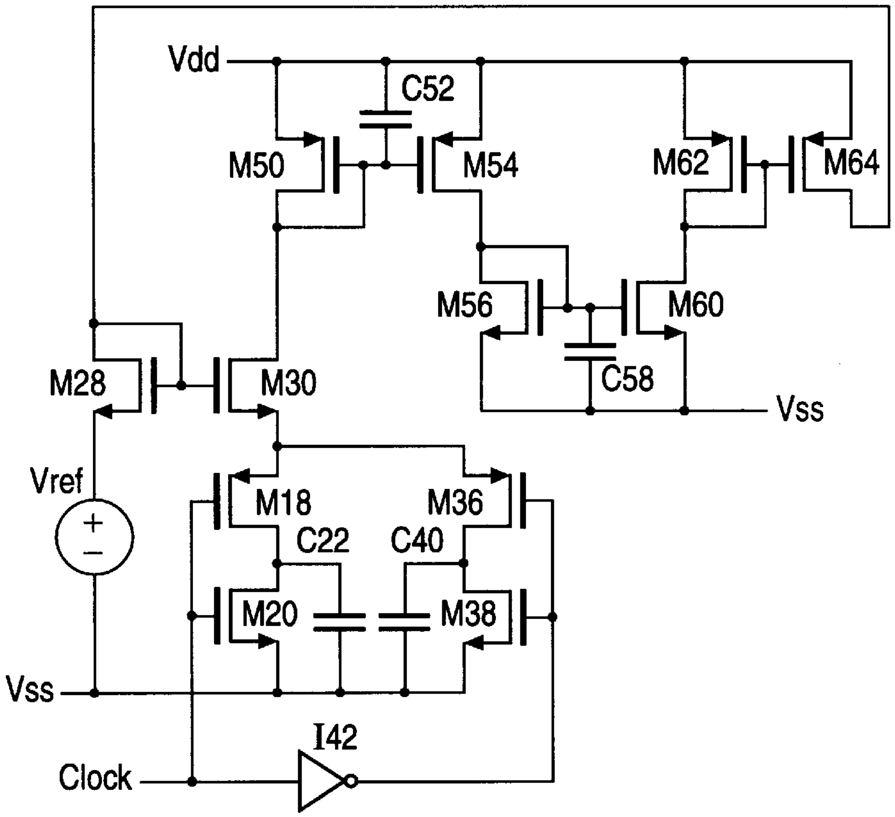
FIGURE 4 (PRIOR ART)
FIG. 4 is a schematic diagram of a conventional switched capacitor reference current source.

Referring to FIG. 5, a switched capacitor bias circuit (preferably in integrated circuit form) for generating a reference signal which is proportional to absolute temperature, a capacitance and a clock signal frequency in accordance with one embodiment of the present invention uses a double-sampled switched capacitor "resistor" Cs and an integration capacitor CI inside a PTAT loop to generate an output bias current Ibias which is proportional to the clock frequency and absolute temperature, as well as its load capacitance. Transistors M1, M2, M4 and M5 form part of a current mirror circuit which is biased by a bias circuit formed in part by transistors M3 and M6. Capacitors CI and Cs and transistors Msa, Msb, Msc and Msd form a switched capacitor circuit which uses a mirrored current I1 from the current mirror circuit to accumulate and discharge charges across the capacitors CI, Cs (as discussed in more detail below). Diode D2 has a junction area of A and can be implemented as a parasitic substrate PNP transistor. Diodes D1 and D3 have normalized junction areas of unity.

An additional current mirror branch circuit is formed in part by transistors M7 and M8 to produce the output bias current $I_{bias}$ which is a replicated, i.e., mirrored, version of the primary current mirror current I2. The master clock signal CLOCK is inverted by an invertor circuit to produce corresponding inverse clock signals CLOCK, $\overline{\text{CLOCK}}$ for driving the switching transistors Msa, Msb, Msc, Msd within the switched capacitor circuit.

The PTAT loop servos in such a manner as to maintain the voltage VI across the integrating capacitor CI at a value which is equal to an average of the natural logarithm of the area A of diode D2 times Boltzmann's constant K times absolute temperature T divided by charge q (=In(A)*KT/q). If the voltage VI across the integration capacitor CI becomes less than this average, this means that diode D2 is conducting more current than D1. Under these conditions, current I1 through transistor M1 is greater than the primary current mirror current I2. Due to the current mirror action of transistors M4 and M5, the drain current of M4 is equal to the primary mirror current I2. However, since the drain current of transistor M1 is greater than the primary mirror current I2, i.e., drawing more current from the node connecting the gate terminal of transistor M6 and compensation capacitor Cc, the voltage at node A decreases. In turn, this causes the drain current of transistor M6 to increase, thereby causing the voltage at node C to increase. Further in turn, this pulls up the voltage potential at the gate terminal of transistor M1, thereby increasing the voltage potential at node B. Still further in turn, this causes the average of the voltage VI across the integration capacitor CI to increase. Hence, this feedback action drives the loop to correct and maintain the average value of the voltage VI across the integration capacitor CI.

In summary then, the average value of the voltage VI across the integration capacitor CI is a function of the area A of diode D2. Since diode D2 has a larger junction area than diode D1, the current density in diode D2 is less than the current density in diode D1 and, therefore, the forward-bias voltage drop VD2 across diode D2 is less than the forward-bias voltage drop VD1 across diode D1. Hence, since the voltages at the source terminals of transistors M1 and M2 are equal, this voltage difference VD2−VD1 appears in the form of the voltage VI across the integration capacitor CI.

Figure 6:
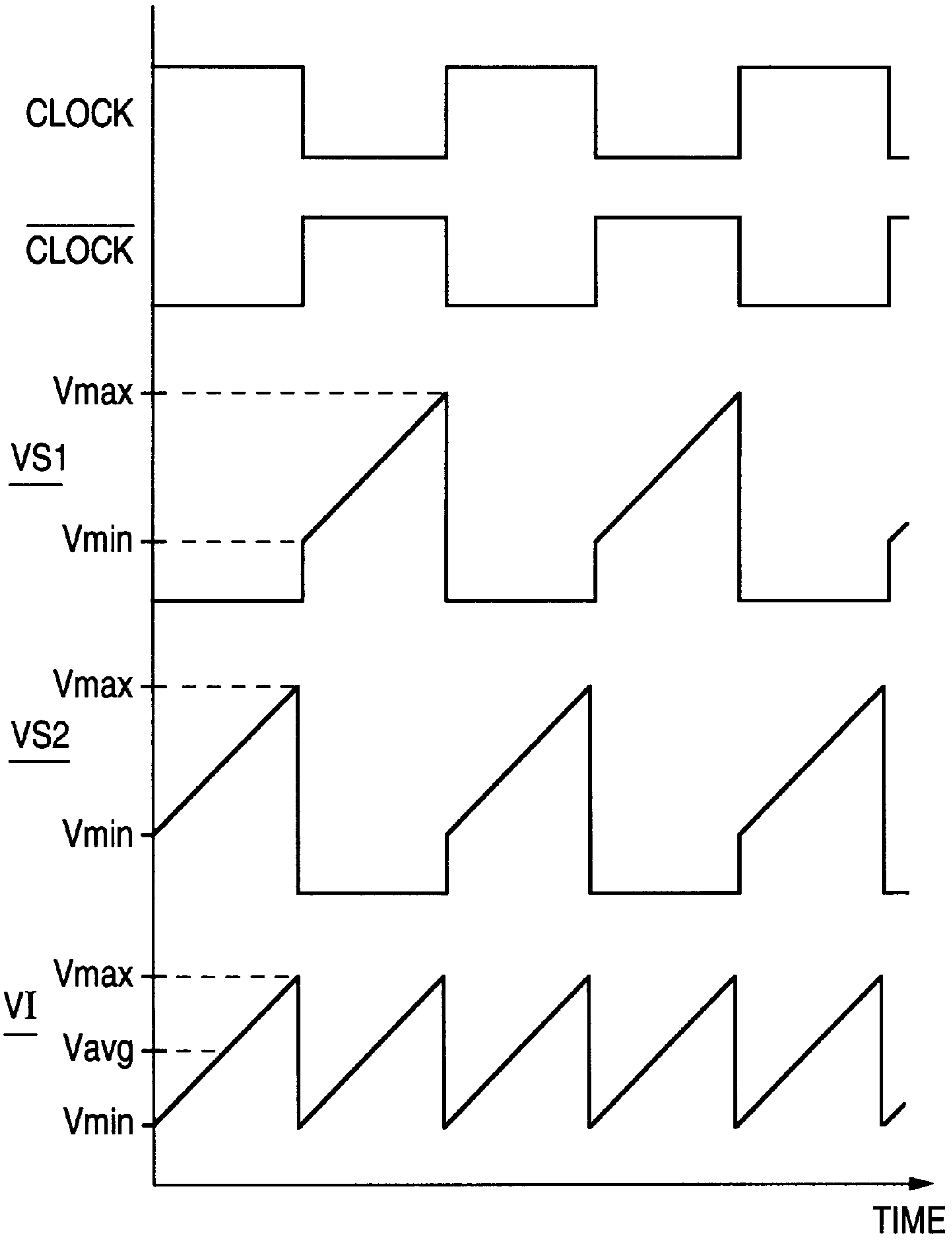
FIG. 6 is a timing diagram with waveforms for selected signals in the circuit of FIG. 5.

Referring to FIG. 6, the operation of this circuit can perhaps be better understood by considering the details of the voltage within the switched capacitor loop. During both phases CLOCK, $\overline{\text{CLOCK}}$ of the clock signal, the drain current I1 of transistor M1 will charge a total capacitance of CI+Cs, thereby creating a ramp-shaped voltage waveform. For a 50% duty cycle clock signal the ramp will move linearly from a minimum voltage Vmin to a maximum voltage Vmax. Each time a sampling capacitor CS with zero initial voltage (due to the discharging action of transistors Msa and Msd) is switched across the integration capacitor CI, charge sharing occurs. This charge sharing action establishes the ratio of the minimum voltage Vmin (i.e, the initial ramp voltage) to the maximum voltage Vmax (i.e., the final ramp voltage) as the ratio of CI/(Cs+CI). Because the ramp is linear, the average voltage is equal to ln(A)KT/q, i.e., the arithmetic mean of the maximum Vmax and minimum Vmin voltages. This can be expressed according to Equation (10) below.

$$V_{avg} = \ln(A)\cdot\frac{KT}{q} = 0.5\cdot V_{\max}\cdot\left(1+\frac{CI}{CI+Cs}\right) \tag{10}$$

Rearranging and solving for the maximum voltage Vmax produces Equation (11).

$$V_{\max} = 2\cdot\ln(A)\cdot\frac{KT}{q}\cdot\left(\frac{CI+Cs}{2\cdot CI+Cs}\right) \tag{11}$$

The minimum voltage Vmin can then be found using Equations (12) and (13).

$$V_{\min} = V_{\max}\cdot\left(\frac{CI}{CI+Cs}\right) \tag{12}$$

$$V_{\min} = 2\cdot\ln(A)\cdot\frac{KT}{q}\cdot\left(\frac{CI}{2\cdot CI+Cs}\right) \tag{13}$$

The amplitude of the voltage ramp is the difference between the maximum Vmax and Vmin voltages, as expressed in Equation (14).

$$V_{\max} - V_{\min} = 2\cdot\ln(A)\cdot\frac{KT}{q}\cdot\left(\frac{CI}{2\cdot CI+Cs}\right) \tag{14}$$

To solve for the drain current I1 of transistor M1, it is noted that the load capacitance during charging is the sum of the sampling capacitance Cs and integration capacitance CI. During steady state operation, the primary current I2 and mirrored currents I1, Ibias are equal. Therefore, the output bias current Ibias can be computed in accordance with Equation (15).

$$Ibias = (Cs+CI)\cdot\frac{dv}{dT} = \frac{4\cdot(Cs+CI)\cdot\ln(A)\cdot\frac{KT}{q}\cdot\left(\frac{Cs}{2\cdot CI+Cs}\right)}{T_{clock}} \tag{15}$$

Accordingly, by substituting Equation (15) into Equation (5) the relationship for the unity gain frequency $f_{unity}$ can be expressed according to Equation (16).

$$f_{unity} \propto \frac{4\cdot(Cs+CI)\cdot\ln(A)\cdot\left(\frac{Cs}{2\cdot CI+Cs}\right)}{n\cdot C_{LOAD}\cdot T_{clock}} \tag{16}$$

Under normal circumstances, the sampling capacitance Cs, integration capacitance CI and load capacitance $C_{LOAD}$ (not shown) will track each other due to the fact that the corresponding capacitors are fabricated from the same material. Accordingly, it can be seen in Equation (16) that the unity gain frequency $f_{unity}$ will be inversely proportional to the clock period, or alternatively, proportional to the clock frequency.

The circuit of FIG. 5 provides a high degree of power supply rejection since the drain and source voltages of all "matched" device pairs are designed to be matched within tens of millivolts. For example, transistor pair M1/M2 and pair M4/M5 have well matched operating points.

Further, charge injection is inherently cancelled by the double sampling design. For example, when switching transistor Msb turns off, thereby dumping its channel charge, transistor Msa turns on, thereby collecting the channel charge. Similar charge injection cancellation occurs on the opposite clock phase with transistors Msc and Msd.

Further still, node A is a high impedance node at which compensation provides a low frequency dominant pole that filters out ripple. The compensation capacitor Cc provides the low frequency filter pole at the frequency of 1/(Rds*Cc). Additional filtering and power supply rejection is established based upon the RC time constant of the filter capacitor Cfilter and the drain-to-source resistance of transistor M7 which is biased in triode mode (resistive) with a bias voltage V1.

The foregoing equations assume that the operational transconductance amplifiers are biased in subthreshold mode. If, however, the input MOSFETs are biased in strong inversion modes, other equations will apply. For example, for biasing in saturation mode, Equation (17) below will apply.

$$g_m = \frac{\partial I_D}{\partial V_{GS}} = \sqrt{\frac{2\mu CoxWI_D}{L}} \quad \text{(saturation)} \tag{17}$$

Substituting for the drain current $I_D$ in Equation (15) into Equation (17), we obtain Equation (18).

$$gm = \sqrt{\frac{2\mu CoxW(4\cdot(Cs+CI)\cdot Cs\cdot\ln(A)\cdot KT)}{L\cdot q\cdot(2\cdot CI+Cs)\cdot T_{clock}}} \tag{18}$$

The carrier mobility $\mu$ has a temperature dependence of $T^{-3/2}$. When this is combined with the linear temperature dependence of the PTAT current, the overall temperature variance of the transconductance $g_m$ will be $T^{-1/4}$. For a temperature range of −40 to +100° C., the overall spread of transconductance $g_m$ variations due to temperature will be within a range of ±5.7%.

The unity gain frequency $f_{unity}$ is proportional to the quotient of the transconductance $g_m$ and load capacitance $C_{LOAD}$ (=$g_m/C_{LOAD}$). Substituting this expression into Equation (18) demonstrates that the sensitivity of the unity gain bandwidth $f_{unity}$ to capacitor variations is −½. In other words, for every 10% increase in capacitance value, the unity gain frequency will decrease by approximately 5%. Additionally, there will be a dependence upon the effective channel length L of the transistors.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including an integrated switched capacitor bias circuit for generating a reference signal which is proportional to absolute temperature, a capacitance and a clock signal frequency, said integrated switched capacitor bias circuit comprising:

a current mirror circuit that includes primary, first and second circuit branches and, in response to a bias voltage received via said primary and first circuit branches, provides a node voltage via said first circuit branch and provides a primary current, a first mirrored current and a second mirrored current via said primary, first and second circuit branches, respectively, wherein said node voltage is responsive to said first mirrored current;

a bias circuit, coupled to said current mirror circuit, that provides said bias voltage in response to said node voltage; and a switched capacitor circuit, coupled to said first current mirror circuit branch, that includes a capacitance and, in response to first and second clock signals which are equal in frequency and mutually inverse in phase, receives and conducts said first mirrored current in proportion to an absolute temperature of said switched capacitor circuit, said capacitance and said clock signal frequency;

wherein said second mirrored current is proportional to a product of said absolute temperature, said capacitance and said clock signal frequency.

2. The apparatus of claim 1, wherein said current mirror circuit comprises:

a current source stage that sources said primary current and conducts said first mirrored current in response to said bias voltage; and a current mirror stage, connected to said current source stage, that provides said first mirrored current in response to said primary current.

3. The apparatus of claim 2, further comprising a current mirror branch circuit, coupled to said current mirror stage, that replicates said primary current to provide said second mirrored current.

4. The apparatus of claim 1, wherein said bias circuit comprises:

a first transistor that provides a bias current in response to said node voltage; and a second transistor, coupled to said first transistor, that provides said bias voltage in response to said bias current.

5. The apparatus of claim 1, wherein said primary current and said first and second mirrored currents are substantially equal.

6. The apparatus of claim 1, further comprising an inverter circuit, coupled to said switched capacitor circuit, that inverts a master clock signal to provide said first and second clock signals.

7. An apparatus including an integrated switched capacitor bias circuit for generating a reference signal which is proportional to absolute temperature, a capacitance and a clock signal frequency, said integrated switched capacitor bias circuit comprising:

a current mirror circuit that provides a primary current, first and second mirrored currents and a node voltage in response to a bias voltage, wherein said node voltage is responsive to said first mirrored current;

a bias circuit, coupled to said current mirror circuit, that provides said bias voltage in response to said node voltage; and a switched capacitor circuit, coupled to said current mirror circuit, that includes a capacitance and, in response to first and second clock signals which are equal in frequency and mutually inverse in phase, receives and conducts said first mirrored current in proportion to an absolute temperature of said switched capacitor circuit, said capacitance and said clock signal frequency;

wherein said second mirrored current is proportional to a product of said absolute temperature, said capacitance and said clock signal frequency; and wherein said switched capacitor circuit includes a diode with a diode junction area and a voltage developed across said capacitance in accordance with said first mirrored current corresponds to said diode junction area.

8. An apparatus including an integrated switched capacitor bias circuit for generating a reference signal which is proportional to absolute temperature, a capacitance and a clock signal frequency, said integrated switched capacitor bias circuit comprising:

a current mirror circuit that provides a primary current, first and second mirrored currents and a node voltage in response to a bias voltage, wherein said node voltage is responsive to said first mirrored current;

a bias circuit, coupled to said current mirror circuit, that provides said bias voltage in response to said node voltage; and a switched capacitor circuit, coupled to said current mirror circuit, that includes a capacitance and, in response to first and second clock signals which are equal in frequency and mutually inverse in phase, receives and conducts said first mirrored current in proportion to an absolute temperature of said switched capacitor circuit, said capacitance and said clock signal frequency;

wherein said second mirrored current is proportional to a product of said absolute temperature, said capacitance and said clock signal frequency; and wherein said switched capacitor circuit comprises:

a primary capacitive circuit that accumulates a primary electrical charge in response to said first mirrored current;

a first switched capacitive circuit, coupled to said primary capacitive circuit, that, in response to said first and second clock signals, alternately accumulates a first shared electrical charge from said first capacitive circuit and a first switched electrical charge, and discharges said accumulated first shared and switched electrical charges; and a second switched capacitive circuit, coupled to said primary capacitive circuit, that, in response to said first and second clock signals, alternately accumulates a second shared electrical charge from said first capacitive circuit and a second switched electrical charge, and discharges said accumulated second shared and switched electrical charges.

9. The apparatus of claim 8, wherein said primary capacitive circuit comprises a capacitor and a diode coupled in series.

10. The apparatus of claim 8, wherein:

said primary capacitive circuit comprises a first capacitor and a diode coupled in series;

said first switched capacitive circuit comprises a second capacitor, and a first plurality of switching transistors, coupled to said second capacitor and said primary capacitive circuit, that, in response to said first and second clock signals, alternately couples said first and second capacitors, and discharges said second capacitor; and said second switched capacitive circuit comprises a third capacitor, and a second plurality of switching transistors, coupled to said third capacitor and said primary capacitive circuit, that, in response to said first and second clock signals, alternately couples said first and third capacitors, and discharges said third capacitor.

11. The apparatus of claim 8, wherein:

said accumulations of said first and second shared electrical charges define a minimum voltage;

said accumulations of said first and second shared electrical charges and said first and second switched electrical charges define a maximum voltage; and said minimum and maximum voltages define an average voltage.

12. The apparatus of claim 11, wherein:

said primary capacitive circuit comprises a diode with a diode junction area; and said average voltage corresponds to said diode junction area.

13. The apparatus of claim 11, wherein said minimum and maximum voltages vary in relation to said absolute temperature.

14. A method of generating a reference signal which is proportional to absolute temperature, a capacitance and a clock signal frequency, comprising the steps of:

receiving a bias voltage via primary and first circuit branches and in response thereto generating a node voltage via said primary circuit branch, a primary current via said primary circuit branch, a first mirrored current via said first circuit branch, and a second mirrored current via said first circuit branch, wherein said node voltage is responsive to said first mirrored current;

receiving said node voltage and in response thereto generating said bias voltage; and receiving, with a capacitive circuit having a capacitance, first and second clock signals which are equal in frequency and mutually inverse in phase and in response thereto receiving and conducting said first mirrored current in proportion to an absolute temperature, said capacitance and said clock signal frequency;

wherein said second mirrored current is proportional to a product of said absolute temperature, said capacitance and said clock signal frequency.

15. The method of claim 14, wherein said step of receiving a bias voltage and in response thereto generating a primary current, first and second mirrored currents and a node voltage comprises:

receiving said bias voltage and in response thereto sourcing said primary current and conducting said first mirrored current; and receiving said primary current and in response thereto generating said first mirrored current.

16. The method of claim 15, further comprising the step of replicating said primary current and in response thereto generating said second mirrored current.

17. The method of claim 14, wherein said step of receiving said node voltage and in response thereto generating said bias voltage comprises:

receiving said node voltage and in response thereto generating a bias current; and receiving said bias current and in response thereto generating said bias voltage.

18. The method of claim 14, wherein said primary current and said first and second mirrored currents are substantially equal.

19. The method of claim 14, further comprising the step of receiving and inverting a master clock signal and in accordance therewith generating said first and second clock signals.

20. A method of generating a reference signal which is proportional to absolute temperature, a capacitance and a clock signal frequency, comprising the steps of:

receiving a bias voltage and in response thereto generating a primary current, first and second mirrored currents and a node voltage, wherein said node voltage is responsive to said first mirrored current;

receiving said node voltage and in response thereto generating said bias voltage;

receiving, with a capacitive circuit having a capacitance, first and second clock signals which are equal in frequency and mutually inverse in phase and in response thereto receiving and conducting said first mirrored current in proportion to an absolute temperature, said capacitance and said clock signal frequency; and generating, across said capacitance and in accordance with said first mirrored current, a voltage which corresponds to a diode junction area;

wherein said second mirrored current is proportional to a product of said absolute temperature, said capacitance and said clock signal frequency.

21. A method of generating a reference signal which is proportional to absolute temperature, a capacitance and a clock signal frequency, comprising the steps of:

receiving a bias voltage and in response thereto generating a primary current, first and second mirrored currents and a node voltage, wherein said node voltage is responsive to said first mirrored current;

receiving said node voltage and in response thereto generating said bias voltage; and receiving, with a capacitive circuit having a capacitance, first and second clock signals which are equal in frequency and mutually inverse in phase and in response thereto receiving and conducting said first mirrored current in proportion to an absolute temperature, said capacitance and said clock signal frequency;

wherein said second mirrored current is proportional to a product of said absolute temperature, said capacitance and said clock signal frequency and wherein said step of receiving, with a capacitive circuit having a capacitance, first and second clock signals which are equal in frequency and mutually inverse in phase and in response thereto receiving and conducting said first mirrored current in proportion to an absolute temperature, said capacitance and said clock signal frequency comprises:

receiving said first mirrored current and in response thereto accumulating a primary electrical charge;

receiving said first and second clock signals and in response thereto alternately accumulating a first shared electrical charge from said primary electrical charge and a first switched electrical charge, and discharging said accumulated first shared and switched electrical charges; and receiving said first and second clock signals and in response thereto alternately accumulating a second shared electrical charge from said primary electrical charge and a second switched electrical charge, and discharging said accumulated second shared and switched electrical charges.

22. The method of claim 21, wherein said step of receiving said first mirrored current and in response thereto accumulating a primary electrical charge comprises charging a capacitor while conducting said first mirrored current via a diode.

23. The method of claim 21, wherein:

said step of receiving said first mirrored current and in response thereto accumulating a primary electrical charge comprises charging a first capacitor while conducting said first mirrored current via a diode;

said step of receiving said first and second clock signals and in response thereto alternately accumulating a first shared electrical charge from said primary electrical charge and a first switched electrical charge and discharging said accumulated first shared and switched electrical charges comprises receiving said first and second clock signals and in response thereto alternately charging said first capacitor and a second capacitor and discharging said second capacitor; and said step of receiving said first and second clock signals and in response thereto alternately accumulating a second shared electrical charge from said primary electrical charge and a second switched electrical charge and discharging said accumulated second shared and switched electrical charges comprises receiving said first and second clock signals and in response thereto alternately charging said first capacitor and a third capacitor and discharging said third capacitor.

24. The method of claim 21, wherein:

said accumulations of said first and second shared electrical charges define a minimum voltage;

said accumulations of said first and second shared electrical charges and said first and second switched electrical charges define a maximum voltage; and said minimum and maximum voltages define an average voltage.

25. The method of claim 24, wherein said average voltage is proportional to a diode junction area.

26. The method of claim 24, wherein said minimum and maximum voltages vary in relation to said absolute temperature.

* * * * *